Patented July 14, 1953

2,645,648

UNITED STATES PATENT OFFICE 2,645,648

STABILIZATION OF GLYCERIDE OILS WITH OXYDIALKANOIC ACIDS

Cyril D. Evans, John C. Cowan, and Arthur W. Schwab, Peoria, Ill., assignors to the United States of America as represented by the Secretary of Agriculture No Drawing. Application October 5, 1951, Serial No. 250,009

10 Claims. (Cl. 260—398.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the treatment of glyceride oils or fats and such related materials as synthetically produced esters of long chain fatty acids and edible compositions comprising fats of animal or vegetable origin. It relates particularly to the treatment of such fatty substances to prevent oxidative deterioration and to increase the storage life of such fatty substances, particularly as food materials.

Glyceride oils of animal or vegetable origin are known to deteriorate more or less rapidly in storage and to develop off-flavors and odors which reduce their utility and value as food materials or as ingredients in pharmaceutical or cosmetic compositions. This deterioration is mainly due to oxidative processes which are extremely difficult to control. Difficulty of control is due largely to the presence of small quantities of metals which act as autoxidation catalysts.

According to this invention, glyceride oils which contain small quantities of metallic constituents of the class which possesses oxidative catalytic properties are treated to remove such metals or to neutralize their catalytic effect, thus increasing the oxidative stability of the oil.

We have discovered that oxydialkanoic acids, particularly those in which the alkane chain between the carboxyl group and ether linkage is less than 3 carbon atoms in length, such as oxydiacetic acid (diglycolic acid) and oxydipropionic acid, when added to the glyceride oils or fats, or the glyceride derivatives previously mentioned, impart improved flavor and oxidative stability. These acids apparently have the ability to nullify the catalytic action of the metals, such as iron and copper, which commonly act as autoxidation catalysts in oils.

Accordingly, we utilize our discoveries to increase the oxidative stability and the flavor stability of glycerides, particularly vegetable oils, such as soybean oil, cottonseed oil, peanut oil, mustard seed oil, corn oil, perilla oil, safflower oil, and the like, by adding thereto stabilizing amounts of the oxydialkanoic acids. The effect of this stabilizer is pronounced, particularly in the case of oils bearing appreciable amounts of dissolved iron.

Glyceride oils vary in their natural stability, and also vary in their content of heavy metal impurities. In the case of commercially refined edible oils of varied agronomic origin, the iron content has been found to vary as much as one hundred fold, ranging from 0.03 part per million upward. The copper content has been found to vary as much as ten fold, from 0.01 part per million up to 0.1 part per million. Moreover, the metal equipment with which the oil comes in contact during handling is believed to contribute somewhat to the heavy metal content of the oil.

As previously mentioned, the oxydialkanoic acids give excellent results in general to produce an oil with improved oxidative and flavor stability, thus increasing the storage life of the oil. Oxydiacetic acid is especially effective in stabilizing oils which have abnormally high iron content.

According to our invention, the addition of the stabilizer is relatively simple, since it is readily dispersible in the oil, and the addition may be effected at any desired stage in the conventional treatment of the oil. For example, it may be added to the raw oil, or it may be added at any convenient stage of conventional refining. For the sake of convenience in a process involving refining followed by deodorization, we prefer to add the stabilizer to the oil before the steam deodorization step. By our invention, we are thus able to produce a raw oil or a refined oil, or food, pharmaceutical, or cosmetic compositions with improved stability.

We add to the oil an amount of stabilizer ranging from 0.001 to 0.1 percent based on the weight of the oil. In the following examples, samples of vegetable oils were treated with the designated oxydialkanoic acid just before the deodorization step of a conventional refining procedure. Deodorization was carried out in a laboratory steam deodorizer for three hours at 210° C. Control samples containing no stabilizer were also subjected to the tests for purposes of comparison. As a further basis for comparison, oil samples containing added catalytically active metals were also evaluated, both with and without the stabilizer.

A chemical evaluation, based on the active oxygen method (Swift stability test), was made, which provides the peroxide values, taken after the samples are blown with air for 8 hours at 208° F. These are termed the A. O. M. values. The oils were also evaluated organoleptically. The taste panel was composed of persons skilled in taste testing, and the flavor scores given below are based on a 1 to 10 scoring system in which the highest score is 10. A flavor score of 6.0 or higher indicates an acceptable oil. The results are tabulated below.

TABLE

| Oil | Control | | | 0.01% oxydiacetic acid | | | 0.01% oxydipropionic acid | | |
|---|---|---|---|---|---|---|---|---|---|
| | A.O.M. | Flavor score | | A.O.M. | Flavor score | | A.O.M. | Flavor score | |
| | | At 0 time | Stored 4 da. at 60° C. | | At 0 time | Stored 4 da. at 60° C. | | At 0 time | Stored 4 da. at 60° C. |
| Oil No. 1, soybean | 30.1 | -- | -- | 8.5 | -- | -- | -- | -- | -- |
| Oil No. 2, soybean | 15.7 | 8.5 | 5.7 | 2.4 | 8.8 | 6.5 | -- | -- | -- |
| Oil No. 2+0.3 p. p. m. Fe | 64.0 | 4.5 | 3.2 | 5.4 | 8.0 | 6.1 | -- | -- | -- |
| Oil No. 3, soybean | 25.6 | 8.2 | 5.7 | 2.6 | 8.6 | 6.6 | -- | -- | -- |
| Oil No. 3+0.1 p. p. m. Cu | 77.0 | 5.7 | 2.6 | 12.4 | 8.4 | 6.2 | -- | -- | -- |
| Oil No. 4, soybean | 44.0 | 8.6 | 5.9 | -- | -- | -- | 27.3 | 8.9 | 6.5 |
| Oil No. 4+0.3 p. p. m. Fe | 96.7 | 4.9 | 3.9 | -- | -- | -- | 37.8 | 8.7 | 6.5 |
| Oil No. 5, soybean | 47.1 | 8.1 | 6.4 | -- | -- | -- | 30.2 | 7.9 | 5.3 |
| Oil No. 6, soybean [1] | 50.5 | -- | -- | 5.8 | -- | -- | -- | -- | -- |
| Oil No. 7, cottonseed | 37.5 | -- | -- | 24.6 | -- | -- | -- | -- | -- |

[1] At concentrations of oxydiacetic acid of 0.1% and 0.001% the A. O. M. values for this oil were 4.1 and 41.8, respectively.

Likewise, we may substitute for the vegetable oils in the foregoing examples, others such as corn oil, perilla oil, safflower oil and the like, or hydrogenated vegetable oils, animal oils and fats, such as lard, lard oil or tallow. Moreover, corresponding stabilizing effects are obtained in preventing the oxidative deterioration of the raw glycerides.

The stabilizing effect of the oxydialkanoic acids of this invention has been explained in part in the foregoing specification by the ability of the stabilizers to nullify the deleterious effects of heavy metal autoxidation catalysts present in the oil. It is to be understood that this invention is not limited to such explanation, inasmuch as we have found that our stabilizers are effective in preserving the odor and taste of the oils without specific dependence on the presence of autoxidation catalysts.

We claim:

1. A new composition of matter, a glyceride oil and a stabilizing amount of one of the group consisting of oxydiacetic acid and oxydipropionic acid.

2. A new composition of matter as described in claim 1 in which the glyceride oil is of vegetable origin and the stabilizer is present within the range of 0.001 to 0.1 percent based on the weight of the oil.

3. The composition of claim 2 in which the stabilizer is oxydiacetic acid.

4. The composition of claim 2 in which the stabilizer is oxydipropionic acid.

5. The composition of claim 3 in which the oil is soybean oil.

6. The composition of claim 4 in which the oil is soybean oil.

7. Process of stabilizing a glyceride oil against oxidative deterioration which comprises incorporating into the oil from 0.001 to 0.1 percent oxydialkanoic acid based on the weight of the oil, and in which the alkane chain between the carboxyl group and the ether oxygen is less than 3 carbon atoms in length.

8. Process of claim 7 in which the oxydialkanoic acid is oxydiacetic acid.

9. Process of claim 7 in which the oxydialkanoic acid is oxydipropionic acid.

10. In a process for refining a glyceride oil which includes the conventional steps of refining and steam deodorization, the improvement which comprises adding to the oil 0.001 to 0.1 percent oxydialkanoic acid prior to said deodorization.

CYRIL D. EVANS.
JOHN C. COWAN.
ARTHUR W. SCHWAB.

References Cited in the file of this patent

UNITED STATES PATENTS

| Number | Name | Date |
|---|---|---|
| 2,369,640 | Barnum | Feb. 20, 1945 |
| 2,397,976 | O'Leary | Apr. 9, 1946 |